United States Patent [19]

Wada et al.

[11] 4,322,513

[45] Mar. 30, 1982

[54] EPOXY RESIN-BASED COMPOSITIONS

[75] Inventors: Moriyasu Wada, Kanagawa; Shuichi Suzuki, Yokohama; Takeo Ito, Kawasaki; Shuzi Hayase, Yokohama, all of Japan

[73] Assignee: Tokyo Shibaura Denki Kabushiki Kaisha, Kawasaki, Japan

[21] Appl. No.: 160,290

[22] Filed: Jun. 17, 1980

[30] Foreign Application Priority Data

Jun. 25, 1979 [JP] Japan .................................. 54-79059

[51] Int. Cl.³ ....................... C08G 59/68; C08G 59/70
[52] U.S. Cl. ..................................... 525/507; 528/92; 528/361; 528/416
[58] Field of Search ................. 528/92, 361, 410, 412, 528/416; 525/507

[56] References Cited

U.S. PATENT DOCUMENTS

| | | | |
|---|---|---|---|
| 3,578,615 | 5/1971 | Moore et al. | 528/92 X |
| 3,657,159 | 4/1972 | Vandenberg | 528/92 X |
| 3,725,341 | 4/1973 | Rogers et al. | 528/92 X |
| 3,812,214 | 5/1974 | Markovitz | 260/830 TW |
| 3,971,747 | 7/1976 | Bank et al. | 260/37 SB |

*Primary Examiner*—Earl A. Nielsen
*Attorney, Agent, or Firm*—Oblon, Fisher, Spivak, McClelland & Maier

[57] ABSTRACT

An epoxy resin-based composition contains epoxy resins and a catalytic amount of latent curing catalysts which comprise organosilicon compounds having hydrolyzable groups and aluminum compound having organic groups.

12 Claims, No Drawings

EPOXY RESIN-BASED COMPOSITIONS

BACKGROUND OF THE INVENTION

I. Field of the Invention

The present invention relates to an epoxy resin-based composition and, more particularly, to an epoxy resin-based composition which has good stability in storage at normal temperatures and which rapidly cures at elevated temperatures to have various excellent characteristics.

II. Description of the Prior Art

Epoxy resins, when cured, may exhibit various favorable physical characteristics such as good adhesiveness, as well as good mechanical, electrical and thermal characteristics. Generally, agents for curing epoxy resins may include a hardner such as polyamines, acid anhydrides, phenols or the like, and a curing catalyst such as boron trifluoride ($BF_3$) complexes, tertiary amines or the like.

Polyamines may react strongly with the epoxy resin, so that resins containing them may not be stored for long periods of time. Acid anhydrides and phenols may require high temperatures and heating for a long period of time to cure the epoxy resin. Although $BF_3$ complexes may cure the epoxy resin at relatively low temperatures, the resulting cured resin has inadequate electrical and mechanical characteristics at high temperatures. Tertiary amines requires high temperatures to cure the resin and may cause reshes on human skin.

It has recently been proposed that a metal chelate compound be employed as a latent curing agent for epoxy resins. Chelate compounds, however, must be used in a relatively large amount and require temperatures as high as 200° C. or higher for curing epoxy resins, and a necessary catalytic amount of them do not dissolve easily in epoxy resins.

A curing method is also known in which an epoxy resin is subjected to a curing reaction using an organosilicone having a silanol group and an organic boron compound or an organic titanium compound; however, this reaction system cannot provide satisfactory stability in storage, and the resulting cured material has impaired electrical characteristics so that it is not generally practical.

SUMMARY OF THE INVENTION

Accordingly, an object of the present invention is to provide a curable epoxy resin-based composition having good storage stability.

Another object of the present invention is to provide an epoxy resin-based composition readily curable under relatively mild temperature conditions.

A further object of the present invention is to provide an epoxy resin-based composition which, when cured, has favorable electrical, thermal and mechanical characteristics.

In accordance with the present invention, there is provided an epoxy resin-based composition comprising:
an epoxy resin; and
a catalytic amount of a latent curing catalyst comprising;
(A) one or more organosilicon compounds having at least one hydrolyzable groups bonded directly to silicon atom, said organosilicon compound being selected from the group consisting of organosilanes and organosiloxanes, and
(B) at least one aluminum compound having organic groups.

DETAILED DESCRIPTION OF THE PREFERRED EMBODIMENTS

As stated hereinabove, the epoxy resin-based composition according to the present invention contains a catalytic amount of a latent curing catalyst comprising (A) an organosilicon compound and (B) an aluminum compound. The term "curing catalyst" referred to herein is intended to mean an agent which functions to accelerate and complete the curing reaction of epoxy resin, but which does not in fact participate directly in the curing reaction. The "latent" catalyst does not exhibit this function at normal ambient temperatures, but does achieve it at elevated temperatures, i.e., 130° C. or higher. Accordingly, the instant composition containing such a catalyst exhibits a latent curability.

The organosilicon compound (A) is selected from organosilanes and organosiloxanes having at least one hydrolyzable group bonded directly to silicon atom. Preferred organosilanes are represented by the following formula:

wherein each R is independently an alkyl group, phenyl group, an aralkyl group, vinyl group or allyl group, R* is a hydrolyzable group, l is 1, 2 or 3; m is 0, 1 or 2; n is 1, 2 or 3; provided that the sum of l+m+n is 4.

When R is an alkyl group or an aralkyl group, the alkyl moiety may have up to about 20 carbon atoms, and preferably up to 5 carbon atoms. The alkyl group includes methyl, ethyl, propyl, butyl, pentyl or the like. The aralkyl group includes benzyl or the like. The group R may be substituted with a non-hydrocarbon radical excluding radicals containing an amino nitrogen; for example, a halogen or the like.

R* is usually selected from the following groups:
an alcoholate or alkoxyl group represented by the formula: —OR' (wherein R' is an alkyl group, usually $C_1$-$C_4$ alkyl, and preferably methyl or ethyl);
a carboxylic acid ester group represented by the formula:

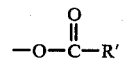

(wherein R' is an alkyl group usually having up to 20 carbon atoms);
a halogen group represented by the formula: —X (wherein X is a halogen atom, i.e., chlorine, bromine, iodine or fluorine); and
an oxime group represented by the formula:

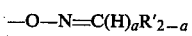

(wherein R' is hydrogen or an alkyl radical, and a is 0 or 1).

Preferred organosiloxanes may be represented by the formula:

$$(R^5)_3-SiO-(SiO)_x-(R^7)_3 \quad (II)$$
$$\overset{(R^6)_2}{|}$$

wherein $R^5$, $R^6$ and $R^7$ independently represent hydrogen atom, an alkyl group, phenyl group, vinyl group, an aralkyl group, allyl group or a hydrolyzable group, at least one of the hydrocarbon groups and at least one hydrolyzable group being present; and x is 0 or 1 or an integer greater than 1.

In the formula (II), the hydrocarbon radicals (i.e., alkyl, phenyl, vinyl, aralkyl and allyl groups) and the hydrolyzable group are the same as in the formula (I). In the formula, x is usually an integer up to 50. Further, as an organosilicon compound silicone resins having at least one hydrolyzable group bonded directly to Si atom may be used.

The organosilicon compound (A) mentioned hereinabove may be used as a mixture of two or more of these compounds. Generally, the organosilicon compounds (A) may be employed in an amount of 0.0001 to 10 percent by weight, and preferably approximately 0.01 to 5 percent by weight based on the weight of the epoxy resin used.

The other ingredient (B) of the latent curing catalyst in accordance with the present invention is the aluminum compound having organic groups. The organic portion bonded to the aluminum portion may be an alkoxy group, phenoxy or a substituted phenoxy group, an acyl group, an acyloxyl group, a beta-dicarbonyl compound or the like. Examples of these aluminum compounds include alkoxides such as methoxide, ethoxide, isopropoxide or the like; phenoxides such as phenoxide, p-methylphenoxide or the like; acyloxy compounds such as acetate, stearate, butyrate, propionate, isopropionate or the like; chelate compounds with a ligand such as acetylacetone, trifluoroacetylacetone, pentafluoroacetylacetone, ethylacetoacetate, salicylaldehyde, diethylmalonate or the like of aluminum.

The aluminum compound (B) mentioned hereinabove may be used in a mixture of two or more of them. The aluminum compound (B) is usually employed in an amount of 0.0001 to 10 percent, preferably from 0.01 to 5 percent by weight based on the weight of the epoxy resin used.

The epoxy resin which is the major component of the composition according to the present invention is known in the art, and many are commercially available. The epoxy resin according to the present invention is not limited to a particular one and may include, for example, bisphenol A type epoxy resin; bisphenol F type epoxy resin; phenol novolak type epoxy resin; an alicyclic epoxy resin; a heterocyclic-containing epoxy resin such as triglycidyl isocyanate or hydantoin epoxy resin; an aliphatic epoxy resin succh as propylene glycoldiglycidyl ether or pentaerythritol-polyglycidyl ether; hydrogenated bisphenol A type epoxy resin; an epoxy resin obtained by reaction of an aromatic, aliphatic or alicyclic carboxylic acid with epichlorohydrin; a glycidyl ether type epoxy resin which is a reaction product of ortho-allylphenol, a novolak compound and epichlorohydrin; spiro-cyclic containing epoxy resin; a glycidyl ether type epoxy resin which is a reaction product of a diallylbisphenol compound having the allyl groups in the ortho positions to each of the hydroxyl groups of bisphenol A with epichlorohydrin, or the like. However, epoxy resins derived from N, N-diglycidyl phenylamine are not preferred.

When the latent curing catalysts are added to bisphenol A type epoxy resin, phenol novolak type epoxy resin or an alicyclic epoxy resin, they are particularly preferred because the epoxy resin has a greatly reduced corrosivity to metals and greatly enhanced electrical characteristics.

The epoxy resin-based compositions according to the present invention are advantageous in that their stability during storage is good, and they are easy to handle because they can readily be cured, for example at temperatures of 130° C. or higher. The compositions are suitable for casting, impregnation or molding as solvent-free compositions by proper selection of the kind of the epoxy resin and formulation of the composition.

They are also easily dissolved in a low boiling point, weakly polar solvent such as dioxane, tetrahydrofuran or the like, so that they may be readily employed for the formation of composite plates because they may be easily used for impregnation with or coated on glasscloth, paper or the like. Furthermore, the cured resins can achieve excellent heat resistance, mechanical characteristics, and electrical insulation characteristics.

The epoxy resin-based compositions according to the present invention may contain inorganic fillers such as graphite particles.

The present invention will be more fully understood from the following examples. In the following examples and comparative examples, the units "part", "parts" and "%" are all by weight.

EXAMPLES 1 TO 3 AND COMPARATIVE EXAMPLES 1 AND 2

Nine compositions including two comparative compositions were prepared from epoxy resins and curing catalysts in the amounts indicated in Table 1 below. These compositions were measured for their gellation times at various temperatures, and the results are shown also in Table 1.

TABLE 1

| | | Composition (Parts) | | | | | | | | |
|---|---|---|---|---|---|---|---|---|---|---|
| | | Examples | | | | | | | Comparative Ex. | |
| | | 1 | 2 | 3 | 4 | 5 | 6 | 7 | 1 | 2 |
| Ingredients | | | | | | | | | | |
| Epoxy Resins | Chissonox 221[1] | 100 | 100 | 100 | 100 | — | — | — | 100 | — |
| | Shodain 540[2] | — | — | — | — | 100 | 100 | 100 | — | 100 |
| Curing Catalysts | Q1-3037[3] | 1 | — | — | — | 1 | — | — | — | — |
| | ETS[4] | — | 0.5 | — | 2 | — | 0.5 | — | — | — |
| | PTS[5] | — | — | 0.5 | — | — | — | 0.5 | — | — |
| | Al(acac)$_3$[6] | 1 | 0.5 | 0.5 | 0.5 | 1 | 0.5 | 0.5 | 1 | 1 |
| Time Required for Gellation | Curing Temperature 100 | — | 50 | — | — | — | — | — | — | — |
| | 120 | — | 18 | >180 | 32 | — | — | — | — | — |
| | 140 | >180 | 13 | 50 | 20 | — | >180 | >180 | — | — |

TABLE 1-continued

|  |  | Composition (Parts) | | | | | | | | |
|---|---|---|---|---|---|---|---|---|---|---|
|  |  |  | Examples | | | | | | Comparative Ex. | |
|  |  |  | 1 | 2 | 3 | 4 | 5 | 6 | 7 | 1 | 2 |
| (sec) | (°C.) | 160 | 35 | 8 | 8 | 9 | — | 65 | 43 | — | — |
|  |  | 180 | 13 | 6 | 5 | — | 87 | 32 | 20 | — | — |
|  |  | 200 | 10 | — | — | — | 54 | 12 | 9 | 53 | 90 |

Note:
[1] Trade mark of alicyclic epoxy resin (product of Chisso K.K.) represented by the formula:

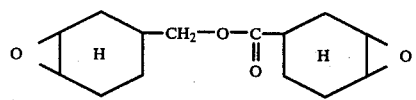

[2] Trade mark of diglycidyl hexahydrophthalate epoxy resin manufactured by Showa Denko K.K.
[3] Trade mark of polymethylphenyl siloxane having —$OCH_3$ groups in the amount of 18% (manufactured by Toray Silicon K. K.)
[4] 2-(3,4-cyclohexenoxy) ethyltrimethoxysilane
[5] 3-(glycidyloxy) propyltrimethoxysilane
[6] Aluminum triacetylacetonate It is apparent from Table 1 that the addition of a mixture of aluminum triacetylacetonate and a silane compound having methoxy groups or siloxane compound greatly accelerates, the curing reaction.

The compositions prepared in Examples 3 and 6 were each poured into a casting mold and heat cured at 100° C. for 3 hours, at 150° C. for 3 hours and then at 180° C. for 10 hours to provide 2 mm thick cured resin plates. 20×20 mm specimens were cut away from each of the above plates and observed for its weight loss during heating, and the remainder was measured for electrical characteristics. The results are shown in Table 2.

TABLE 2

| Test Samples | Example 3 | Example 6 |
|---|---|---|
| Weight loss after heating at 190° C. for 1000 hours (%) | 8.5 | 6.9 |
| Volume resistivity at 180° C. (Ω . cm) | $8.3 \times 10^{18}$ | $2.1 \times 10^{18}$ |
| Dissipation Factor at 180° C. (%) | 1.5 | 4.5 |

EXAMPLE 8 AND COMPARATIVE EXAMPLE 3

A resin composition containing 100 parts of Chissonox 221, 0.5 part of Q1-3037 and 0.5 part of Al(acac)$_3$ was cured at 90° C. for 8 hours and then at 180° C. for 12 hours. The resulting cured product was measured for heat distorsion temperature and electrical characteristics (dissipation factor), and the results are shown in Table 3 below.

As a comparison, a resin composition comprising 100 parts of Chissonox 221 and 0.5 part of Al(acac)$_3$ was cured in the same manner as above and measured in the same manner as above. The results are also shown in Table 3 below.

TABLE 3

|  |  | Test Samples | |
|---|---|---|---|
| Characteristics | | Example 8 | Comparative Ex. 3 |
| Heat Distorsion Temperature (°C.) | | 163 | 156 |
| Dissipation Factor (%) | at 130° C. | 0.84 | 1.08 |
|  | at 180° C. | 1.32 | 1.88 |
|  | at 220° C. | 2.86 | 8.33 |
|  | at 260° C. | 5.20 | 9.70 |

EXAMPLES 9 TO 11 AND COMPARATIVE EXAMPLES 4 AND 5

A composition comprising Chissonox 221, ETS and Al(acac)$_3$ in varying amounts as indicated in Table 4 below was formulated and cured at the temperatures as indicated in Table 4 below. The resulting cured materials were measured for their dissipation factor at various temperatures. The results are also shown in Table 4 below.

For comparison, two compositions having ingredients in varying amounts as indicated in Table 4 below were prepared and cured. Their characteristics were measured under the same conditions, and are also shown in Table 4 below.

TABLE 4

|  |  |  | Composition (parts) | | | | |
|---|---|---|---|---|---|---|---|
|  |  |  | Examples | | | Comparative Ex. | |
| Ingredients |  |  | 9 | 10 | 11 | 4 | 5 |
| Chissonox 221 |  |  | 100 | 100 | 100 | 100 | 100 |
| ETS |  |  | 0.2 | 0.5 | 0.5 | — | — |
| Al(acac)$_3$ |  |  | 0.2 | 0.5 | 0.5 | 0.2 | 0.5 |
| Curing Temperature (°C.) | | | 180 | 180 | 140 | 180 | 180 |
| Dissipation factor (%) | Measuring Temperature (°C.) | 180 | 0.98 | 0.95 | 0.31 | Not cured | 1.85 |
|  |  | 220 | 1.57 | 1.80 | 2.91 | Not cured | 3.33 |
|  |  | 260 | 6.76 | 5.42 | 6.56 | Not cured | 9.70 |

It is apparent from Table 4 that the resin compositions according to Examples 9, 10 and 11 provide cured materials having better characteristics than the compositions of Comparative Examples 4 and 5 in which aluminum acetylacetonate alone was added to the epoxy resin. When cured at 140° C., a lower temperature than the temperature at which the compositions of Comparative Examples 4 and 5 were cured, the resin composition of Example 11 provides better characteristics.

EXAMPLE 12 AND COMPARATIVE EXAMPLES 6 AND 7

A composition comprising ingredients in varying amounts as indicated in Table 5 below was placed in a test tube, sealed therein in order to prevent the composition from coming in contact with the air outside and stored at 30° C.

The compositions were measured for number of days when the viscosity exceeded 1,000 cp at 30° C. as a measure of storage stability. The results are shown in Table 5.

TABLE 5

| | Compositions (parts) | | |
|---|---|---|---|
| | Example | Comparative Ex. | |
| Ingredients | 12 | 8 | 9 |
| Chissonox 221 | 100 | 100 | 100 |
| Q1-3037 | 0.5 | — | — |
| Al(acac)₃ | 0.5 | 0.5 | — |
| HN 2200* | — | — | 50 |
| Days when viscosity exceeded 1.000 cp | more than 30 days | more than 30 days | 10 |

*Note:
Trade mark of methyltetrahydrophthalic acid anhydride curing agent manufactured by Hitachi Kasei K.K.

It is apparent from Table 5 that the resin composition according to the present invention is better in storage stability than a conventionally used acid anhydride-epoxy resin system.

EXAMPLE 13

A mixture of 100 parts of Chissonox 221, 200 parts of Epikote 152 (Trade mark of novolak type epoxy resin (product of Shell Chem. Corp.) having the formula:

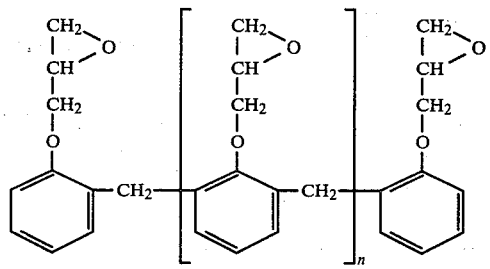

where n is approx. 1) and 3 parts of Q1-3037 was homogeneously dissolved in methyl ethyl ketone at 50° to 60° C. to provide a solution having 50% solids. To 120 parts of this solution were gradually added 0.3 part of aluminum trietylacetoacetate and 40 parts of natural graphite powders having an average particle size of 55μ, and the combination was strieed to give a composition for molding. This solution was filtered under reduced pressure to remove the solvent and was then placed in a mold having a temperature of 180° C. and subjected to a pressure of 180 kg/cm² to provide a plate. After this plate was post-cured at 200° C., its friction coefficient μ was measured by means of an EFM-II-B Type Friction Abrasion Machine (Toyo Baldwin K.K.) and found to be 0.18 under a load of 100 kg. At this time, the exothermal temperature was 162° C. and the PV value was 4,000.

EXAMPLE 14

A portion of the resin solution prepared in Example 13 was coated on an aramide type resin tape (Nomex: Trademark of du Pont) and dried at 100° C. for 10 minutes to thereby convert the coated resin into its B-stage. The amount of resin on the tape was 15 grams/m². The tape was then rolled up at a half lap around a steel pipe having an outer diameter of 10 mm and a length of 150 mm and heated at 180°-200° C. for 10 minutes. The tape was then unrolled, but adjacent layers of tape adhered strongly to each other and were torn.

The resin solution mentioned above was also used to impregnate a glass cloth tape having a thickness of 0.13 mm, a width of 19 mm and a length of 10 m (distribution of glass fiber strands: lengthwise, 40 strands/25 mm; widthwise, 38 strands/25 mm). The impregnated tape was passed at a rate of 1.5 m/minute through a vertical furnace having a height of 1 m which maintained an inner temperature of 105° C. at the upper portion, 140° C. at the middle portion, and 100° C. at the lower portion. The tape was thereby dried and converted to the B-stage. It contained the B-stage resin in the amount of 32%. This tape was easy to handle and formed a fine insulating material having no foam remaining after being rolled and then heated at 180° C. for 10 hours.

The resulting insulating material was measured for its electrical characteristics, and the results are shown in Table 6 below.

TABLE 6

| | |
|---|---|
| Volume resistivity (180° C.), Ω cm | $5.1 \times 10^{18}$ |
| Inductance (180° C.) | 8.4 |
| Dissipation factor (180° C.), % | 2.5 |

EXAMPLES 15 TO 18 AND COMPARATIVE EXAMPLE 8

Five different compositions including one comparative composition were prepared with the ingredients and amounts indicated in Table 7 below.

These compositions were cured at 160° C. for 15 hours to provide resin plates which were in turn measured for their inductance tangents δ as shown in Table 7.

TABLE 7

| | | Composition (parts) | | | | |
|---|---|---|---|---|---|---|
| | | Examples | | | | Comparative Ex. |
| | | 15 | 16 | 17 | 18 | 8 |
| Ingredients | | | | | | |
| Epikote 828[1] | | 40 | 50 | 60 | 50 | 40 |
| Epikote 1001[2] | | 60 | 50 | 40 | — | 60 |
| Epikote 807[3] | | — | — | — | 50 | — |
| TSR-165[4] | | 2 | — | 1 | 2 | — |
| Ph₂Si(OCH₃)₂[5] | | — | 2 | — | — | — |
| Al(acac)₃ | | 2 | 1 | — | 2 | — |
| Al—OiPr[6] | | — | — | 1 | — | — |
| BF₃—EtNH₂ complex[7] | | — | — | — | — | 3 |
| Tan δ | Measuring | 100 | 0.51 | 0.47 | 0.56 | 0.45 | 4.5 |
| (%) | Temperature | 130 | 0.70 | 0.59 | 0.65 | 0.61 | 21.2 |
| | (°C.) | 150 | 2.51 | 2.60 | 2.40 | 1.90 | Immeasurable |
| | | 180 | 3.21 | 3.10 | 3.39 | 3.01 | Immeas- |

TABLE 7-continued

|  | Composition (parts) | | | | |
|---|---|---|---|---|---|
|  | Examples | | | | Comparative Ex. |
|  | 15 | 16 | 17 | 18 | 8 |
|  |  |  |  |  | urable |

Note:
[1] Trade Mark of Shell Chem. Corp.'s bisphenol A/epichlorohydrin type epoxy resin represented by the formula:

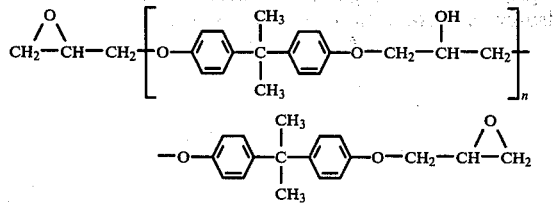

(n = approx. 0) and having an average molecular weight of approximately 380.
[2] Trade mark of Shell Chem. Corp's epoxy resin having the formular as shown in Note 1 above wherein n is approximately 2.0 and the molecular weight of about 900.
[3] Trade mark of bisphenol F/epichlorohydrin type epoxy resin represented by a formula:

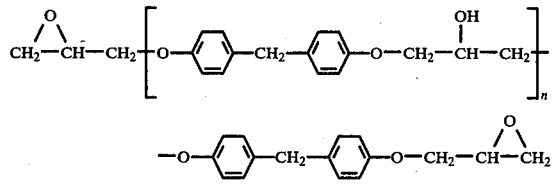

(where n is approximately 0), manufactured by Shell Chemicals
[4] Trade mark of a methylphenylsilicone resin (product of Toshiba silicon K.K.) having a molecular weight of 650 and containing 15% by weight of —$OCH_3$ group.
[5] diphenydimethoxysilane
[6] Aluminum isopropoxide
[7] $BF_3$—monoethylamine complex

EXAMPLES 19 TO 21 AND COMPARATIVE EXAMPLES 9 TO 10

A composition was prepared by combining ingredients in the amounts indicated in Table 8 below. The viscosities of the compositions were measured at 50° C. The compositions were cured at 160° for 15 hours to provide cured resin plates. The plates were then measured for their inductance tangents at various temperatures. The results are shown in Table 8.

TABLE 8

| Ingredients | | Composition (parts) | | | | |
|---|---|---|---|---|---|---|
| | | Examples | | | Comparative Examples | |
| | | 19 | 20 | 21 | 9 | 10 |
| Epikote 828 | | 50 | 50 | 40 | 50 | 50 |
| Epikote 807 | | 50 | 50 | 60 | 50 | 50 |
| $Ph_2Si(OCOCH_3)_2$* | | 2 | — | 2 | — | — |
| $Ph_2Si(OEt)_2$** | | — | 2 | — | — | — |
| $Al(acac)_3$ | | 2 | 2 | 1 | — | 2 |
| Imidazole | | — | — | — | 3 | — |
| Storage stability (days)*** | | 30 | 30 | 30 | 3 | 30 |
| tan δ (%) | Measuring Temperature (°C.) | 130 | 0.81 | 0.85 | 0.71 | Soft plate | Not cured |
| | 150 | 2.79 | 3.10 | 2.90 | Soft plate | Not cured |
| | 180 | 3.51 | 4.02 | 3.98 | Soft plate | Not cured |

*diphenyldiacetoxysilane
**diphenyldiethoxysilane
***days required to become 1,000 cp in viscosity As is apparent from the above-mentioned Examples and Comparative Examples, the resin-based compositions according to the present invention are suitable for use as insulating materials for electrical appliances or the like, such as composite plates, molding materials, prepregs, binding tapes, wedges, shaft bearing materials or the like, because they are suitable for use in impregnation and casting and they are soluble in weakly polar organic solvents with low boiling points.

What we claim is:

1. An epoxy resin-based composition, comprising: an epoxy resin; and a catalytic amount of a latent curing catalyst comprising:
    (a) at least one organosilicon compound having at least one hydrolyzable group bonded directly to silicon, said organosilicon compound being selected from the group consisting of organosilanes and organosiloxanes; and
    (b) at least one aluminum compound being an alkoxide, a phenoxide, an acyloxide or chelate of aluminum or mixtures thereof.

2. A composition according to claim 1, wherein the organosilicon compound (A) is selected from organosilanes represented by the formula:

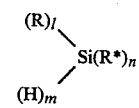

wherein R is independently an alkyl, phenyl, aralkyl, vinyl or allyl group, R* is a hydrolyzable group, l is 1, 2 or 3, m is 0, 1 or 2, and n is 1, 2 or 3, provided that the sum of l+m+n is 4.

3. A composition according to claim 2, wherein the hydrolyzable group is an alcoholate group, a carboxylic acid ester group, a halogen atom or a oxime group.

4. A composition according to claim 3, wherein the organosilane is 2-(3,4-cyclohexenoxy) ethyltrimethoxysilane, 3-(glycidyloxy) propyltrimethoxysilane, diphenyldimethoxysilane, diphenyldiacetoxysilane, diphenyldiethoxysilane or a mixture thereof.

5. A composition according to claim 1, wherein the organosilicon compound (A) is selected from organosiloxanes represented by the formula:

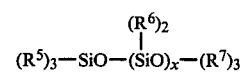

wherein $R^5$, $R^6$ and $R^7$ are each independently hydrogen, an alkyl, phenyl, vinyl, an aralkyl, allyl or a hydrolyzable group, at least one of the hydrocarbon radicals and at least one said hydrolyzable group being present; and x is 0, 1 or an integer greater than 1.

6. A composition according to claim 5, wherein x is 50 or less.

7. A composition according to claim 1, wherein the aluminum compound is aluminum triacetylacetonate, aluminum triethylacetoacetate, aluminum isopropoxide or a mixture thereof.

8. A composition according to claim 1, wherein the epoxy resin is selected from the group consisting of a bisphenol A epoxy resin, a bisphenol F epoxy resin, a phenol novolak epoxy resin, an alicyclic epoxy resin, a hydrogenated bisphenol A epoxy resin, an aliphatic epoxy resin, an epoxy resin obtained by reaction of an aromatic, aliphatic or alicyclic carboxylic acid with epichlorohydrin, a spiro-cyclic containing epoxy resin, a glycidylether epoxy resin obtained by reaction of ortho-alkylphenol novolak compound with epichlorohydrin, and a glycidylether epoxy resin obtained by reaction of a diallylbisphenol compound having the allyl groups in the ortho positions to each of the hydroxyl groups of bisphenol A with epichlorohydrin.

9. A composition according to claim 1, 2, 3, 4, 5, 6, 7 or 8, wherein the latent curing catalyst comprises the organosilicon compound (A) in an amount of 0.0001 to 10 percent by weight and the aluminum compound (B) in an amount of 0.001 to 5 percent by weight, each based on the weight of the epoxy resin.

10. A composition according to claim 9, which is diluted with a relatively weakly polar organic solvent with a low boiling point.

11. A composition according to claim 9, comprising an inorganic filler.

12. A composition according to claim 1, wherein said organosilicon compound is a silicone resin having hydrolyzable groups bonded directly to Si.

* * * * *